US007022787B2

(12) United States Patent
Spence et al.

(10) Patent No.: US 7,022,787 B2
(45) Date of Patent: Apr. 4, 2006

(54) OLEFIN POLYMERIZATION CATALYST

(75) Inventors: Rupert Spence, Ontario (CA); Robert Louis Stevens, Ontario (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/947,672

(22) Filed: Sep. 23, 2004

(65) Prior Publication Data

US 2005/0113248 A1 May 26, 2005

Related U.S. Application Data

(60) Provisional application No. 60/505,906, filed on Sep. 25, 2003.

(51) Int. Cl.
*C08F 4/44* (2006.01)
(52) U.S. Cl. ............... 526/171; 526/172; 526/352; 502/155; 502/167
(58) Field of Classification Search ............... 526/171, 526/172, 352; 502/155, 167
See application file for complete search history.

(56) References Cited

U.S. PATENT DOCUMENTS

| 5,334,796 A | 8/1994 | Lillwitz et al. |
| 5,559,199 A | 9/1996 | Abe et al. |
| 5,650,471 A | 7/1997 | Abe et al. |
| 5,955,555 A | 9/1999 | Bennett |
| 6,103,946 A | 8/2000 | Brookhart, III et al. |
| 6,143,827 A | 11/2000 | Morizono et al. |
| 6,534,691 B1 | 3/2003 | Culver et al. |
| 6,562,918 B1 | 5/2003 | Minami et al. |
| 6,670,434 B1 * | 12/2003 | Benvenuti et al. .......... 526/171 |
| 6,710,006 B1 | 3/2004 | De Boer et al. |

FOREIGN PATENT DOCUMENTS

| DE | 43 07 649 A1 | 9/1993 |
| EP | 1 055 673 A1 | 11/2000 |
| EP | 1 085 025 A1 | 3/2001 |
| WO | WO 95/11077 A2 | 4/1995 |
| WO | WO 98/03521 A1 | 1/1996 |
| WO | WO 99/12981 A1 | 3/1999 |
| WO | WO 00/50470 A2 | 8/2000 |
| WO | WO 02/28805 A2 | 4/2002 |
| WO | WO 03/018667 A1 | 3/2003 |

* cited by examiner

Primary Examiner—Robert D. Harlan

(57) ABSTRACT

Improved suspensions of transition metal complexes of 2,6-diacylpyridine(bisimines) or 2,6-pyridinedicarboxaldehyde(bisimines), which are useful in catalysts for the polymerization or oligomerization of olefins, are prepared by sonicating a mixture of one or more of these complexes and an inert liquid. The resulting suspensions can be directly used as olefin polymerization or oligomerization catalyst components in oligomerization or polymerization processes. These processes may produce, for example, polyolefins useful for molding resins or films, or linear α-olefins.

10 Claims, No Drawings

OLEFIN POLYMERIZATION CATALYST

FIELD OF THE INVENTION

Improved suspensions of transition metal complexes of 2,6-diacylpyridine(bisimines) or 2,6-pyridinedicarboxaldehyde(bisimines), which are useful in catalysts for the polymerization or oligomerization (P/O) of olefins, are prepared by sonicating a mixture of one or more of these complexes and an inert liquid.

TECHNICAL BACKGROUND

Transition metal complexes of various types are important components of olefin P/O catalysts. These catalysts are typically used in a variety of physical forms, for instance in solution, as a suspension, or supported on another solid material, and these forms may be used in one or more types of P/O processes, such as solution, suspension or gas phase processes.

One type of olefin P/O catalyst utilizes a transition metal, often an iron or cobalt, complex of a 2,6-diacylpyridine (bisimine) or a 2,6-pyridinedicarboxaldehyde(bisimine). This type of catalyst is particularly useful in polymerizing ethylene to form high density polyethylene (HDPE), or oligomerizing ethylene to linear α-olefins (LAOs), see for instance U.S. Pat. Nos. 5,955,555, 6,103,946, 6,534,691, and 6,710,006, and World patent applications 99/92981, 00/50470, and 03/0119921, all of which are hereby included by reference. These types of catalysts are also useful for cooligomerizing ethylene and other α-olefins, see for instance WO 02/28805, which is hereby included by reference. In such processes these complexes are sometimes added directly to the P/O process (or first an initial step wherein these complexes are converted to active catalysts) as suspensions in inert liquids. Suspensions prepared from these complexes in the solid form obtained from the synthesis of the complex by simple agitation in an inert liquid yields suspensions, which settle rapidly. Grinding of the solid complexes is complicated by the fact that they are somewhat air, moisture and heat sensitive. Thus, methods of preparing (improved) suspensions of these complexes are useful.

It is known that sonicating (treating with ultrasonic energy) solid particulate material in liquid suspension can deagglomerate and in some instances reduce the primary particle size of solids. However, sonication under these circumstances can lead to localized heating, and in some instances will not reduce particle sizes.

U.S. Pat. Nos. 5,559,199, 5,650,471 and 6,143,827 describe examples in which a mixture of a metallocene polymerization catalyst, and inert liquid and an alkylaluminum compound are treated with ultrasound to obtain a catalyst solution. Nothing is stated about obtaining a suspension of a catalyst.

U.S. Pat. No. 6,562,918 describes a process for producing an improved supported catalyst by exposing certain catalyst components to ultrasound. Unsupported catalysts and their suspensions are not mentioned.

SUMMARY OF THE INVENTION

This invention concerns a process for preparing an olefin polymerization or oligomerization catalyst component, comprising, sonicating a mixture of one or more transition metal complexes of one or both of 2,6-diacylpyridine(bisimines) and 2,6-pyridinedicarboxaldehyde(bisimines) and an inert liquid, to produce a suspension of said complex in said inert liquid.

DETAILS OF THE INVENTION

By "sonication" herein is meant that a composition or material is exposed to ultrasonic waves (energy), preferably in the frequency range of about 18 kHz to about 50 kHz. The intensity (power) of these waves should be such that they induce the effect desired, typically deagglomeration and/or primary particle size reduction of a solid in liquid slurry form. Equipment for generating ultrasonic waves (energy) in the form of appropriate probes or other devices is readily commercially available. The duration of the exposure to the ultrasonic waves will depend on the effect desired, with longer times usually resulting in more complete deagglomeration and/or particle size reduction. However, at some point longer exposure may not result in any further deagglomeration and/or particle size reduction.

A "hydrocarbyl group" is a univalent group containing only carbon and hydrogen. As examples of hydrocarbyls may be mentioned unsubstituted alkyls, cycloalkyls and aryls. If not otherwise stated, it is preferred that hydrocarbyl groups (and alkyl groups) herein contain 1 to about 30 carbon atoms.

By "substituted hydrocarbyl" herein is meant a hydrocarbyl group that contains one or more substituent groups which are inert under the process conditions to which the compound containing these groups is subjected (e.g., an inert functional group, see below). The substituent groups also do not substantially detrimentally interfere with the oligomerization process or operation of the oligomerization catalyst system. If not otherwise stated, it is preferred that (substituted) hydrocarbyl groups herein contain 1 to about 30 carbon atoms. Included in the meaning of "substituted" are rings containing one or more heteroatoms, such as nitrogen, oxygen and/or sulfur, and the free valence of the substituted hydrocarbyl may be to the heteroatom. In a substituted hydrocarbyl, all of the hydrogens may be substituted, as in trifluoromethyl.

By "(inert) functional group" herein is meant a group, other than hydrocarbyl or substituted hydrocarbyl, which is inert under the process conditions to which the compound containing the group is subjected. The functional groups also do not substantially deleteriously interfere with any process described herein that the compound in which they are present may take part in. Examples of functional groups include halo (fluoro, chloro, bromo and iodo), and ether such as —$OR^{50}$ wherein $R^{50}$ is hydrocarbyl or substituted hydrocarbyl. In cases in which the functional group may be near a transition metal atom, the functional group alone should not coordinate to the metal atom more strongly than the groups in those compounds that are shown as coordinating to the metal atom, that is they should not displace the desired coordinating group.

By a "cocatalyst" or a "catalyst activator" is meant one or more compounds that react with a transition metal compound to form an activated catalyst species. One such catalyst activator is an "alkyl aluminum compound" which, herein, means a compound in which at least one alkyl group is bound to an aluminum atom. Other groups such as, for example, alkoxide, hydride, an oxygen atom bridging two aluminum atoms, and halogen may also be bound to aluminum atoms in the compound.

By a "linear α-olefin product" is meant a composition predominantly comprising a compound or mixture of compounds of the formula H(CH$_2$CH$_2$)$_q$CH=CH$_2$ wherein q is an integer of 1 to about 18. In most cases, the linear α-olefin product of the present process will be a mixture of compounds having differing values of q of from 1 to 18, with a minor amount of compounds having q values of more than 18. Preferably, less than 50 weight percent, and more preferably less than 20 weight percent, of the product will have q values over 18. The product may further contain small amounts (preferably less than 30 weight percent, more preferably less than 10 weight percent, and especially preferably less than 2 weight percent) of other types of compounds such as alkanes, branched alkenes, dienes and/or internal olefins.

By a "primary carbon group" herein is meant a group of the formula —CH$_2$—, wherein the free valence—is to any other atom, and the bond represented by the solid line is to a ring atom of a substituted aryl to which the primary carbon group is attached. Thus the free valence—may be bonded to a hydrogen atom, a halogen atom, a carbon atom, an oxygen atom, a sulfur atom, etc. In other words, the free valence—may be to hydrogen, hydrocarbyl, substituted hydrocarbyl or a functional group. Examples of primary carbon groups include —CH$_3$, —CH$_2$CH(CH$_3$)$_2$, —CH$_2$Cl, —CH$_2$C$_6$H$_5$, —OCH$_3$ and —CH$_2$OCH$_3$.

By a "secondary carbon group" is meant the group

wherein the bond represented by the solid line is to a ring atom of a substituted aryl to which the secondary carbon group is attached, and both free bonds represented by the dashed lines are to an atom or atoms other than hydrogen. These atoms or groups may be the same or different. In other words the free valences represented by the dashed lines may be hydrocarbyl, substituted hydrocarbyl or inert functional groups. Examples of secondary carbon groups include —CH(CH$_3$)$_2$, —CHCl$_2$, —CH(C$_6$H$_5$)$_2$, cyclohexyl, —CH(CH$_3$)OCH$_3$, and —CH=CCH$_3$.

By a "tertiary carbon group" is meant a group of the formula

wherein the bond represented by the solid line is to a ring atom of a substituted aryl to which the tertiary carbon group is attached, and the three free bonds represented by the dashed lines are to an atom or atoms other than hydrogen. In other words, the bonds represented by the dashed lines are to hydrocarbyl, substituted hydrocarbyl or inert functional groups. Examples of tetiary carbon groups include —C(CH$_3$)$_3$, —C(C$_6$H$_5$)$_3$, —CCl$_3$, —CF$_3$, —C(CH$_3$)$_2$OCH$_3$, —C≡CH, —C(CH$_3$)$_2$CH=CH$_2$, aryl and substituted aryl such as phenyl and 1-adamantyl.

By "aryl" is meant a monovalent aromatic group in which the free valence is to the carbon atom of an aromatic ring. An aryl may have one or more aromatic rings which may be fused, connected by single bonds or other groups.

By "substituted aryl" is meant a monovalent aromatic group substituted as set forth in the above definition of "substituted hydrocarbyl". Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

The solid(s) being sonicated herein are transition metal complexes of 2,6-diacylpyridine(bisimines) or 2,6-pyridinedicarboxaldehyde(bisimines). Preferably, the transition metal is iron or cobalt, and more preferably, it is iron. These complexes are especially suitable for the (co)polymerization of ethylene and the oligomerization of ethylene to LAOs.

In one form, a "2,6-pyridinedicarboxaldehydebisimine or a 2,6-diacylpyridinebisimine" is meant a compound of the formula

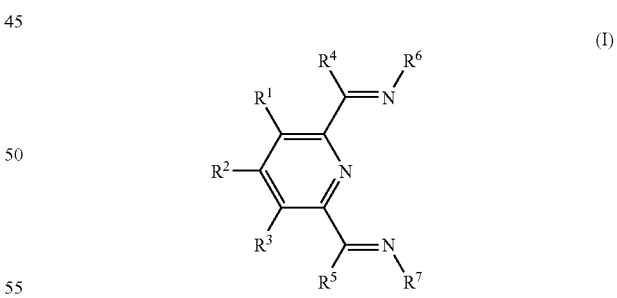

(I)

wherein: R$^1$, R$^2$ and R$^3$ are each independently hydrogen, hydrocarbyl, substituted hydrocarbyl, or an inert functional group; R$^4$ and R$^5$ are each independently hydrogen, hydrocarbyl, an inert functional group or substituted hydrocarbyl; and R$^6$ and R$^7$ are aryl, substituted aryl, or a functional group.

Typically in the complexes of the 2,6-pyridinedicarboxaldehydebisimines or a 2,6-diacylpyridinebisimines there is sufficient steric hindrance about the transition metal atom in the complex so that olefins may be polymerized. Steric hindrance is often provided in (1), at least in part, by $R^6$ and $R^7$. For example $R^6$ may be a phenyl ring of the formula

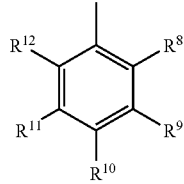
(II)

and $R^7$ may be a phenyl ring of the formula

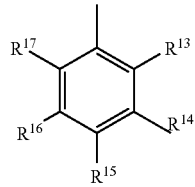
(III)

wherein $R^8$, $R^9$, $R^{10}$, $R^{11}$, $R^{12}$, $R^{13}$, $R^{14}$, $R^{15}$, $R^{16}$, and $R^{17}$ are each independently hydrogen, hydrocarbyl, substituted hydrocarbyl or a functional group. In particular the substitution (if any) on the ortho positions of the phenyl rings, namely what $R^8$, $R^{12}$, $R^{13}$ and $R^{17}$ are particularly important in determining the steric crowding about the iron atom.
This in turn is an important factor in determining the molecular weight of the polymer/oligomer produced.

Generally speaking the more sterically crowded the transition metal atom is, the higher the molecular weight, including the weight average molecular weight, of the polyolefin produced, see for instance B. L. Small, et al., J. Am. Chem. Soc., vol. 120, p. 4049–4050 (1998) and A. M. A. Bennett, Chemtech, vol. 29(7), p. 24–28 (1999), both of which are hereby included by reference. Particularly important in determining the steric crowding about the iron atom in the complexes when (II) and (III) are present are the 4 o-aryl positions, $R^8$, $R^{12}$, $R^{13}$, and $R^{17}$. In particular for these groups, the larger these groups are, the more sterically crowded the iron atom is. In an ethylene polymerization, if one or more of $R^8$, $R^{12}$, $R^{13}$, and $R^{17}$ are hydrogen, often only low molecular weight polymers (oligomers) of ethylene are produced. If $R^8$, $R^{12}$, $R^{13}$, and $R^{17}$ are all methyl a polyethylene is produced, while if $R^8$, $R^{12}$, $R^{13}$, and $R^{17}$ are all isopropyl a still higher molecular weight polyethylene is produced. In one preferred form (to produce polymers such as HPDE) it is preferred that $R^8$, $R^{12}$, $R^{13}$, and $R^{17}$ are not hydrogen. In another preferred form, $R^8$, $R^{12}$, $R^{13}$, and $R^{17}$ are all aryl or substituted aryl (see World Patent Applications 00/50470 and 01/42257).

In another preferred form $R^6$ and $R^7$ are

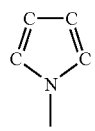
(IV)

wherein the 2 and 5 positions of the pyrrole ring are each independently hydrocarbyl, substituted hydrocarbyl, or a functional group, and the 3 and 4 positions are each independently hydrogen, hydrocarbyl, substituted hydrocarbyl, or a functional group. In an especially preferred form the 2 and 5 positions are each independently aryl or substituted aryl.

In a preferred complex to make LAOs, a preferred ligand has the formula

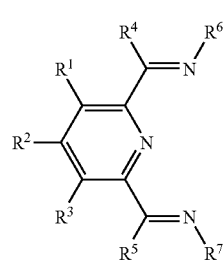
(I)

wherein:

$R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring;

$R^4$ and $R^5$ are each independently hydrogen, hydrocarbyl, substituted hydrocarbyl or an inert functional group;

$R^6$ and $R^7$ are each independently a substituted aryl having a first ring atom bound to the imino nitrogen, provided that:

in $R^6$, a second ring atom adjacent to said first ring atom is bound to a halogen, a primary carbon group, a secondary carbon group or a tertiary carbon group; and further provided that in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

By a "first ring atom in $R^6$ and $R^7$ bound to an imino nitrogen atom" is meant the ring atom in these groups bound to an imino nitrogen shown in (I), for example

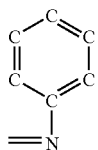

(V)

the atom shown in the 1-position in the ring in (V) (in bold) and is a ring atom bound to an imino carbon atom (other groups which may be substituted on the aryl groups are not shown). Ring atoms adjacent to the first ring atoms are shown, for example, in (V), where the open valencies to these adjacent atoms are shown by dashed lines [the 2,6-positions in (VII)].

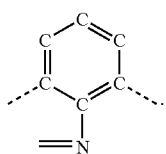

(VIII)

In one preferred compound (I) for making LAOs $R^6$ is

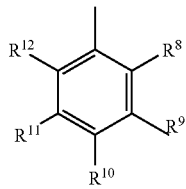

(VI)

and $R^7$ is

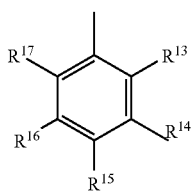

(VII)

wherein:

$R^8$ is a halogen, a primary carbon group, a secondary carbon group or a tertiary carbon group; and $R^9$, $R^{10}$, $R^{11}$, $R^{14}$, $R^{15}$, $R^{16}$ and $R^{17}$ are each independently hydrogen, hydrocarbyl, substituted hydrocarbyl or a functional group; provided that:

when $R^8$ is a halogen or primary carbon group none, one or two of $R^{12}$, $R^{13}$ and $R^{17}$ are a halogen or a primary carbon group, with the remainder of $R^{12}$, $R^{13}$ and $R^{17}$ being hydrogen; or when $R^8$ is a secondary carbon group, none or one of $R^{12}$, $R^{13}$ and $R^{17}$ is a halogen, a primary carbon group or a secondary carbon group, with the remainder of $R^{12}$, $R^{13}$ and $R^{17}$ being hydrogen; or when $R^8$ is a tertiary carbon group, none or one of $R^{12}$, $R^{13}$ and $R^{17}$ is tertiary carbon group, with the remainder of $R^{12}$, $R^{13}$ and $R^{17}$ being hydrogen;

and further provided that any two of $R^8$, $R^9$, $R^{10}$, $R^{11}$, $R^{12}$, $R^{13}$, $R^{14}$, $R^{15}$, $R^{16}$ and $R^{17}$ vicinal to one another, taken together may form a ring.

In the above formulas (VI) and (VII), $R^8$ corresponds to the second ring atom adjacent to the first ring atom bound to the imino nitrogen, and $R^{12}$, $R^{13}$ and $R^{17}$ correspond to the other ring atoms adjacent to the first ring atom. In (VI) and (VII), and in other aryl groups attached to the imino nitrogen atoms, the ortho positions of such rings (the second ring atoms) may be symmetrical or unsymmetrical with respect to one another, see for instance U.S. Pat. No. 6,710,006.

The inert liquid used in the sonication is inert towards the transition metal complex, that is, it does not substantially react with or cause the decomposition of the complex. Preferably it is also a suitably inert liquid to be present in an olefin P/O in which the complex (or a derivative thereof) is a component of the olefin P/O catalyst system. Useful liquid include hydrocarbons such as alkanes such as isobutane and hexane, cycloalkanes such as cyclohexane, and aromatic hydrocarbons such as benzene, toluene and a xylene.

Although it is not necessary that a suspension be initially formed a suspension of the (unsonicated) complex in the inert liquid may formed by (gently) agitating a mixture of the solid complex(es) and the inert liquid. Sonication may then commence. There are no specific limits on the concentration of the complex in the inert liquid, but if it is too dilute it may be too expensive to concentrate the solid to the desired concentration and/or transport the resulting suspension, and if too concentrated, particularly after sonication, the suspension may be too viscous to conveniently handle, for example pump. Preferably, during the sonication, it is preferred that either or both of, a cocatalyst or activator, or a solid support (for the complex), not be present.

Because of the nature of the sonication process, it may be readily carried out in the absence of air and moisture, and apparently with little or no thermal degradation of the complex.

In the resulting suspension (after sonication) the solids stay suspended longer so that a more uniform suspension may be subsequently used, and if the solids do settle they are more readily dispersed into a relatively uniform suspension by agitation. This makes these suspensions particularly useful when they must be transported (for a period of time), stored, or used from a larger supply tank in a plant that is emptied over a relatively long period. In the latter case while some agitation may be needed to maintain uniform slurry, it is relatively mild agitation compared to a slurry, which has not been sonicated. The initially sonicated slurry may be relatively concentrated compared to the concentration needed for use in a P/O plant, but it may be readily diluted for use with mild agitation. This is included within the meaning of using these suspension in a further P/O step.

While the solid may be filtered from the suspension and isolated after sonication (and redispersed in the same or another inert liquid) it is preferred that the suspension (diluted or not) be directly used as a P/O catalyst component. For example the suspension may be added directly to the P/O process stream, which contains any other needed catalyst components such as activators and/or cocatalysts and contacted with the olefin monomer(s) so the P/O can take place. Alternately the suspension may be mixed with any needed cocatalysts and/or activators and then contacted with the olefinic monomers. A preferred olefin (fed to the P/O reactor(s)] comprises ethylene, and a more preferred olefin is ethylene alone.

The polyolefins produced using the complexes discussed herein are useful as molding resins for making parts useful in electronic and electrical devices, automobiles, toys, appliances, bottles and closures, and other items. They are also useful for making films, which may be fashioned into bags, pouches, and other types of containers.

EXPERIMENT 1

A solution of 2,6-bis-[1-(2-methylphenylimino)ethyl]pyridine ligand (9.639 g, 28.3 mmol) in THF (50 ml) was added over 20 min to a clear solution of $FeCl_2 \cdot 4H_2O$ (5.62 g, 28.3 mmol) in tetrahydrofuran (THF) (250 ml). A dark precipitate formed immediately and the quantity of solid increased with ligand addition. After stirring for 1 h the reaction was filter through a coarse glass frit to collect the solid. The solid was then transferred to a flask and placed under vacuum for about 1 h until dry. Yield was 14.28 g. See M. Brookhart et al., J. Am. Chem. Soc. 1998, 120, 7143, Supplementary Material documents, for details of ligand preparation.

EXAMPLE 1

In an inert atmosphere glove box three samples of the complex of Experiment 1 in 86 g each of o-xylene were prepared in Piecre 125 ml glass vials (product No. 12995, walls 20 mm thick, Pierce Biotechnology, Inc., Rockford, Ill. 61105, USA). The vials were then sealed with an aluminum crimp top and septum and the samples removed from the glove box. Sample #1 was shaken by hand for 10 min. Samples #2 and #3 were placed (separately at different times) in a Fisher FS140 Sonicator (13.3 l, 185 watts) bath and sonicated for 30 and 60 min respectively. All three samples were measured for particle size distribution by light scattering analysis using a Malvern Mastersizer® X (MIIA11214, Malvern Instruments, Malvern, Worcestershire, UK WR14 1XZ). Conditions and results for the three samples are shown in Table 1. All particle sizes in Table 1 are in µm.

TABLE 1

| Sample | Wt of Complex (mg) | Sonication Time (min) | Median Particle Size | Mean Particle Size | Smallest Particle Size | Largest Particle Size |
|---|---|---|---|---|---|---|
| 1 | 90.6 | 0 | 17.4 | 34.3 | 0.13 | 457.2 |
| 2 | 88.5 | 30 | 5.39 | 7.33 | 0.12 | 52.68 |
| 3 | 88.7 | 60 | 5.54 | 7.65 | 0.12 | 52.68 |

EXAMPLE 2

The procedure of Example 1 was followed except for the ingredient amounts and sonication times, which are given in Table 2. The suspensions were then filtered using Whatman® (Whatman plc, Maidstone, Kent ME16 OLS, UK) polytetrafluoroethylene polypropylene backed 1 µm membrane filters. Scanning electron microscopy was then used to obtain images of the solids. Observation of these images obtained clearly indicated that longer sonication times led to smaller particle sizes.

TABLE 2

| Sample | Wt of Catalyst (mg) | Wt of Xylene (g) | Sonication Time (h) |
|---|---|---|---|
| 4 | 12.8 | 44.7 | 1 |
| 5 | 12.5 | 42.7 | 2.5 |
| 6 | 12.6 | 42.2 | 4 |

EXAMPLE 3

Two samples were prepared as described in Example 1, except different amounts of ingredients were used, as given in Table 3. In the vial of Sample #7 was a magnetic stirring bar, and this sample was stirred by the bar for 4 h. Sample #8 was sonicated (using the apparatus of Example 1) for 4 h. Each vial was then allowed to stand without agitation and was photographed 0, 1, and 24 h after agitation ceased. The photographs clearly show that the sonicated suspension settles much more slowly than the suspension, which was agitated by the magnetic stirring bar. After 24 h, a lot of the solid of Sample #7 has settled, so that the supernatant appeared almost clear. For sample #8 after 24 h the suspension was still quite opaque, although it appeared some settling had occurred.

TABLE 3

| Sample | Wt of Catalyst (mg) | Wt of Xylene (g) | Stir Time (h) | Sonication Time (h) |
|---|---|---|---|---|
| 7 | 12.8 | 44.7 | 4 | — |
| 8 | 12.5 | 42.7 | — | 4 |

What is claimed is:

1. A process for preparing an olefin polymerization or oligomerization catalyst component, comprising, sonicating a mixture of one or more transition metal complexes of one or both of 2,6-diacylpyridine(bisimines) and 2,6-pyridinedicarboxaldehyde(bisimines) and an inert liquid, to produce a suspension of said complex in said inert liquid.

2. The product of the process of claim 1.

3. The process as recited in claim 1 comprising the additional step of polymerizing one or more olefins, wherein a polymerization catalyst for said polymerizing comprises said suspension.

4. The process as recited in claim 3 wherein said one or more olefins are ethylene.

5. The process as recited in claim 1 comprising the additional step of oligomerizing one or more olefins, wherein an oligomerization catalyst for said oligomerizing comprises said suspension.

6. The process as recited in claim 5 wherein said one or more olefins comprise ethylene.

7. The process as recited in claim 6 wherein linear α-olefins is are produced.

8. The process as recited in claim 1 wherein said 2,6-diacylpyridine(bisimines) and 2,6-pyridinedicarboxaldehyde(bisimines) have the formula

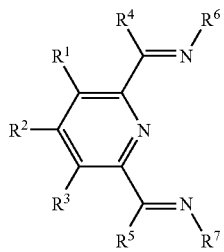

(I)

wherein:

$R^1$, $R^2$ and $R^3$ is each independently hydrogen, hydrocarbyl, substituted hydrocarbyl, or an inert functional group;

$R^4$ and $R^5$ are each independently hydrogen, hydrocarbyl, an inert functional group or substituted hydrocarbyl; and $R^6$ and $R^7$ are aryl, substituted aryl, or a functional group.

9. The process as recited in claim 8 wherein:

$R^6$ is

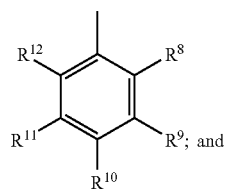

(II)

$R^7$ is

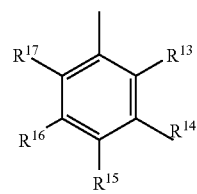

(III)

wherein $R^8$, $R^9$, $R^{10}$, $R^{11}$, $R^{12}$, $R^{13}$, $R^{14}$, $R^{15}$, $R^{16}$, and $R^{17}$ are each independently hydrogen, hydrocarbyl, substituted hydrocarbyl or a functional group.

10. The process as recited in claim 8 wherein $R^6$ and $R^7$ are each independently a substituted aryl having a first ring atom bound to the imino nitrogen, provided that:

in $R^6$, a second ring atom adjacent to said first ring atom is bound to a halogen, a primary carbon group, a secondary carbon group or a tertiary carbon group; and further provided that in $R^6$, when said second ring atom is bound to a halogen or a primary carbon group, none, one or two of the other ring atoms in $R^6$ and $R^7$ adjacent to said first ring atom are bound to a halogen or a primary carbon group, with the remainder of the ring atoms adjacent to said first ring atom being bound to a hydrogen atom; or in $R^6$, when said second ring atom is bound to a secondary carbon group, none, one or two of the other ring atoms in $R^6$ and $R^7$ adjacent to said first ring atom are bound to a halogen, a primary carbon group or a secondary carbon group, with the remainder of the ring atoms adjacent to said first ring atom being bound to a hydrogen atom; or in $R^6$, when said second ring atom is bound to a tertiary carbon group, none or one of the other ring atoms in $R^6$ and $R^7$ adjacent to said first ring atom are bound to a tertiary carbon group, with the remainder of the ring atoms adjacent to said first ring atom being bound to a hydrogen atom.

* * * * *